Figure 1:
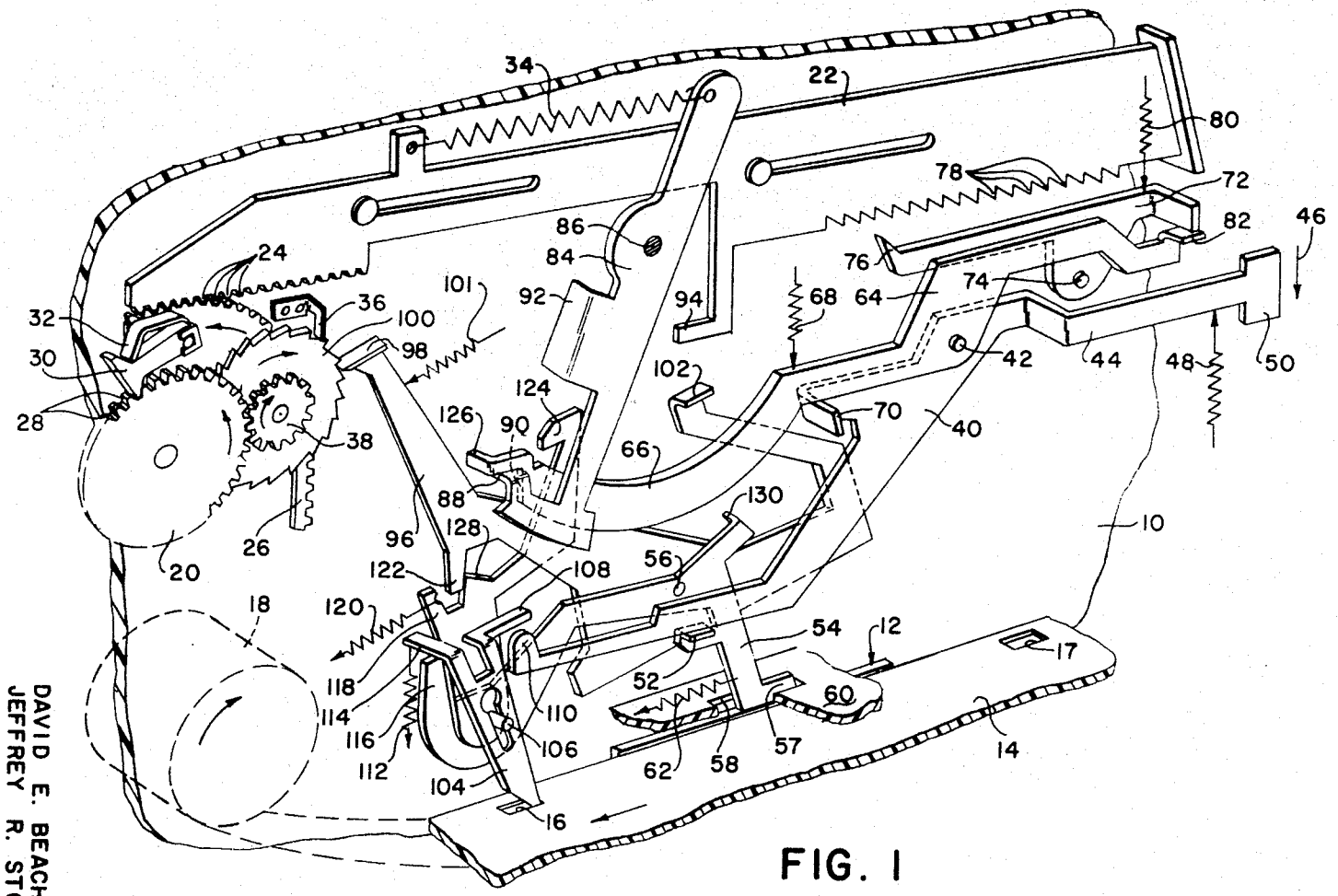
Figure 2:
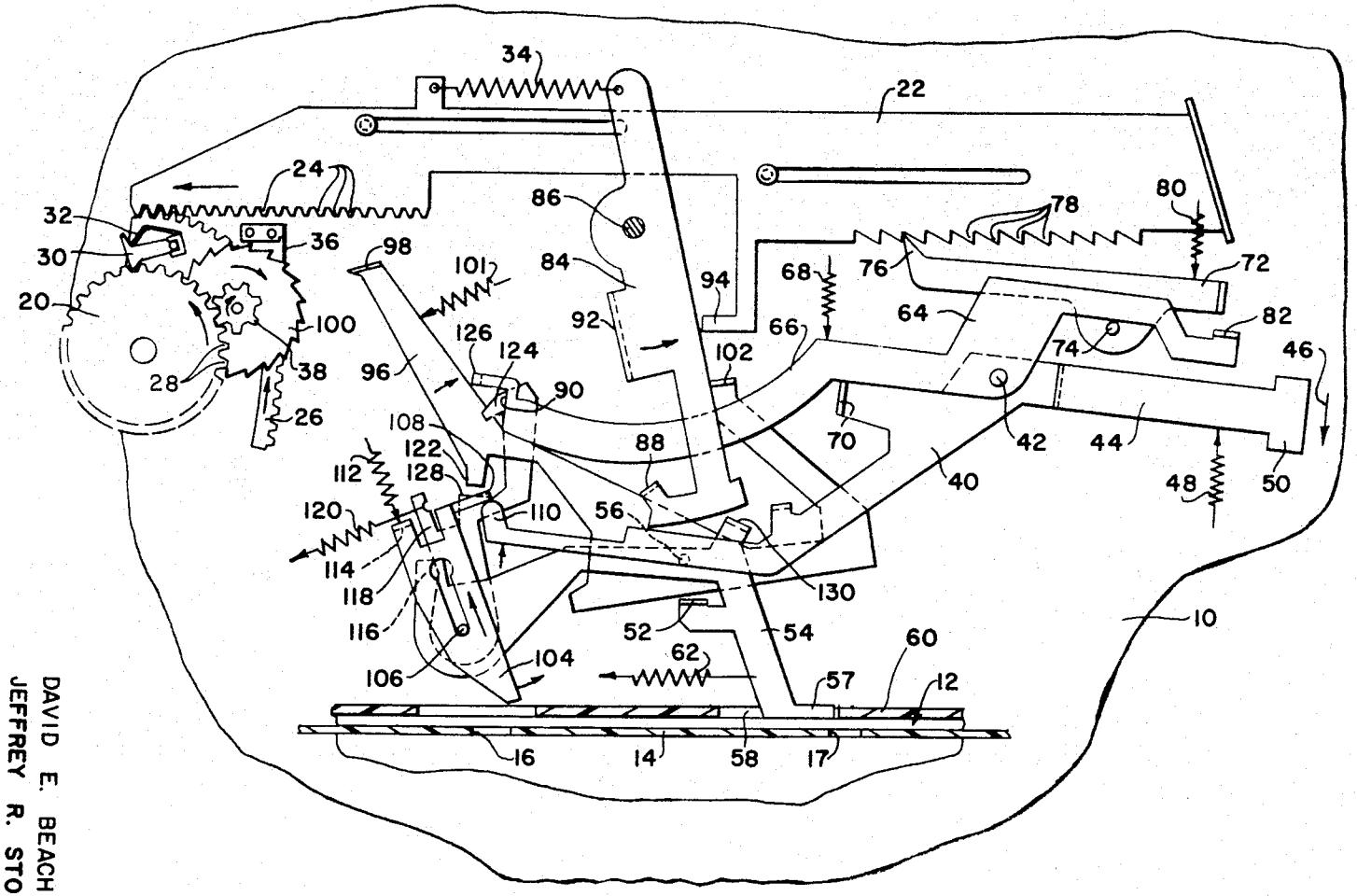
Figure 3:
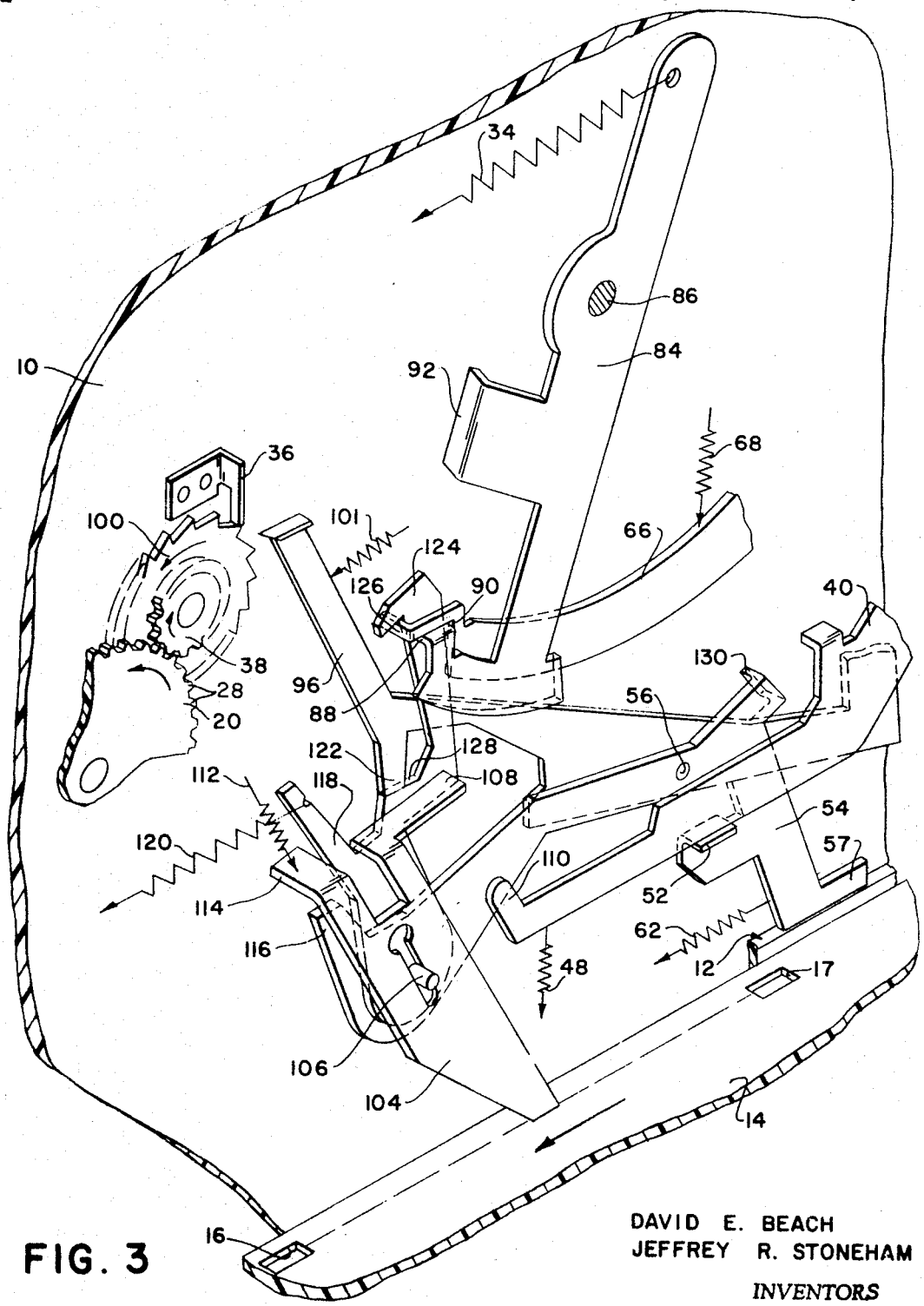
Figure 4:
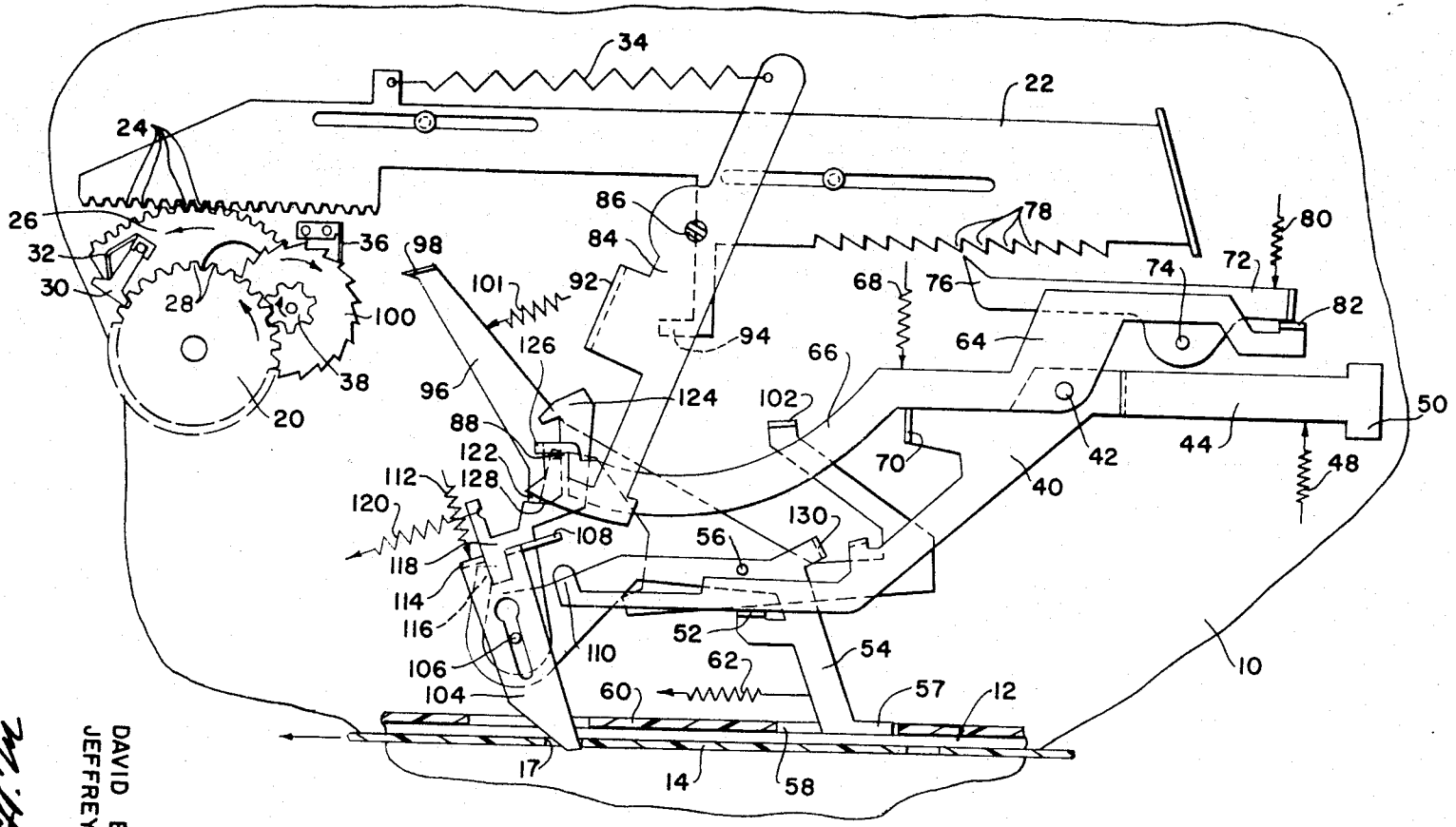
Figure 5:
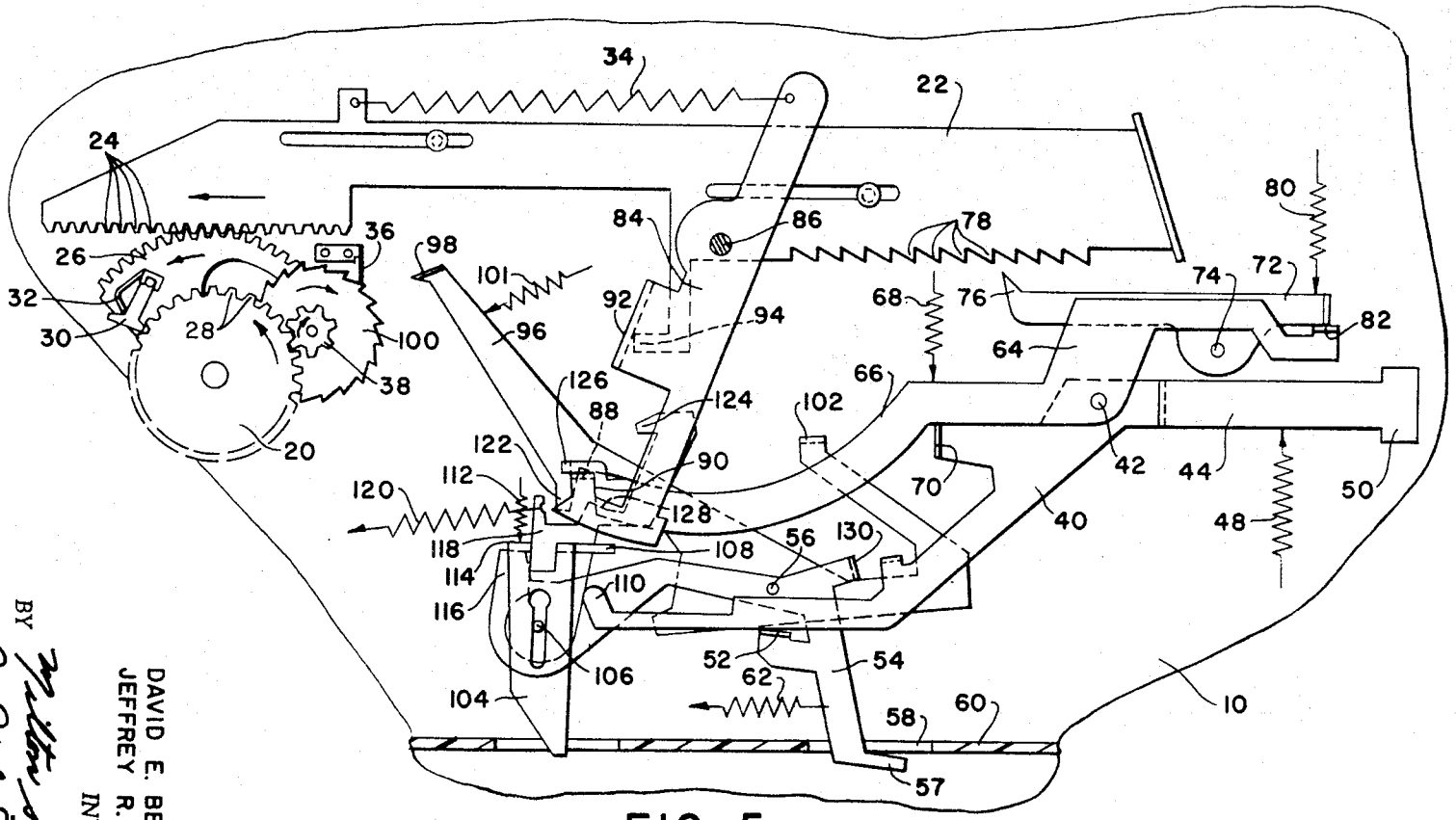

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 24, 1973

912 O.G. 1235

T912,017
CAMERA

David E. Beach, Rochester, and Jeffrey R. Stoneham, Hilton, N.Y. (both of 901 Elmgrove Road, Rochester, N.Y. 14650)

Continuation of abandoned application Ser. No. 203,733, Dec. 1, 1971. This application Nov. 5, 1972, Ser. No. 306,970

Int. Cl. G03b *19/04*
U.S. Cl. 95—31 FL
5 Sheets Drawing. 10 Pages Specification

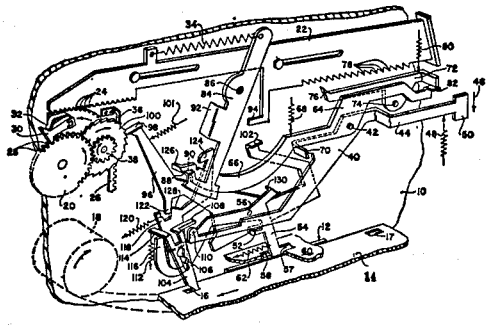

A camera adapted to receive a film cartridge containing roll film perforated at predetermined metering intervals includes a film advancing mechanism which is locked against further film transport when a fresh frame is in registry with the camera's exposure area. A shutter release lever is operable to effect exposure of the film, and a double exposure prevention mechanism prevents depression of the shutter release lever prior to transport of another frame to the camera exposure area upon completion of an exposure. The double exposure prevention mechanism is automatically disabled whenever a cartridge is not located in the camera. A sensing lever 54 abuts a surface on the cartridge received in the camera. If no cartridge is present, the sensing lever is rotated by spring 62 to disable the double exposure mechanism.

CAMERA

Original Filed Dec. 1, 1971 5 Sheets-Sheet 1

DAVID E. BEACH
JEFFREY R. STONEHAM
INVENTORS

BY Milton S. Sales
W. H. J. Kline
ATTORNEYS

CAMERA

Original Filed Dec. 1, 1971 5 Sheets-Sheet 2

DAVID E. BEACH
JEFFREY R. STONEHAM
INVENTORS

BY Milton S. Sales
W. H. J. Kline
ATTORNEYS

CAMERA

Original Filed Dec. 1, 1971 5 Sheets-Sheet 3

DAVID E. BEACH
JEFFREY R. STONEHAM
INVENTORS
BY Milton S. Sales
W. H. J. Kline
ATTORNEYS

CAMERA

Original Filed Dec. 1, 1971 5 Sheets-Sheet 4

DAVID E. BEACH
JEFFREY R. STONEHAM
INVENTORS

BY Milton S. Sales
H. H. J. Kline
ATTORNEYS

CAMERA

Original Filed Dec. 1, 1971 5 Sheets-Sheet 5

DAVID E. BEACH
JEFFREY R. STONEHAM
INVENTORS

BY Milton S. Sales
W. H. J. Kline
ATTORNEYS